May 5, 1931. L. H. BLAKE 1,804,084
FISHING LINE FLOAT
Filed March 14, 1930
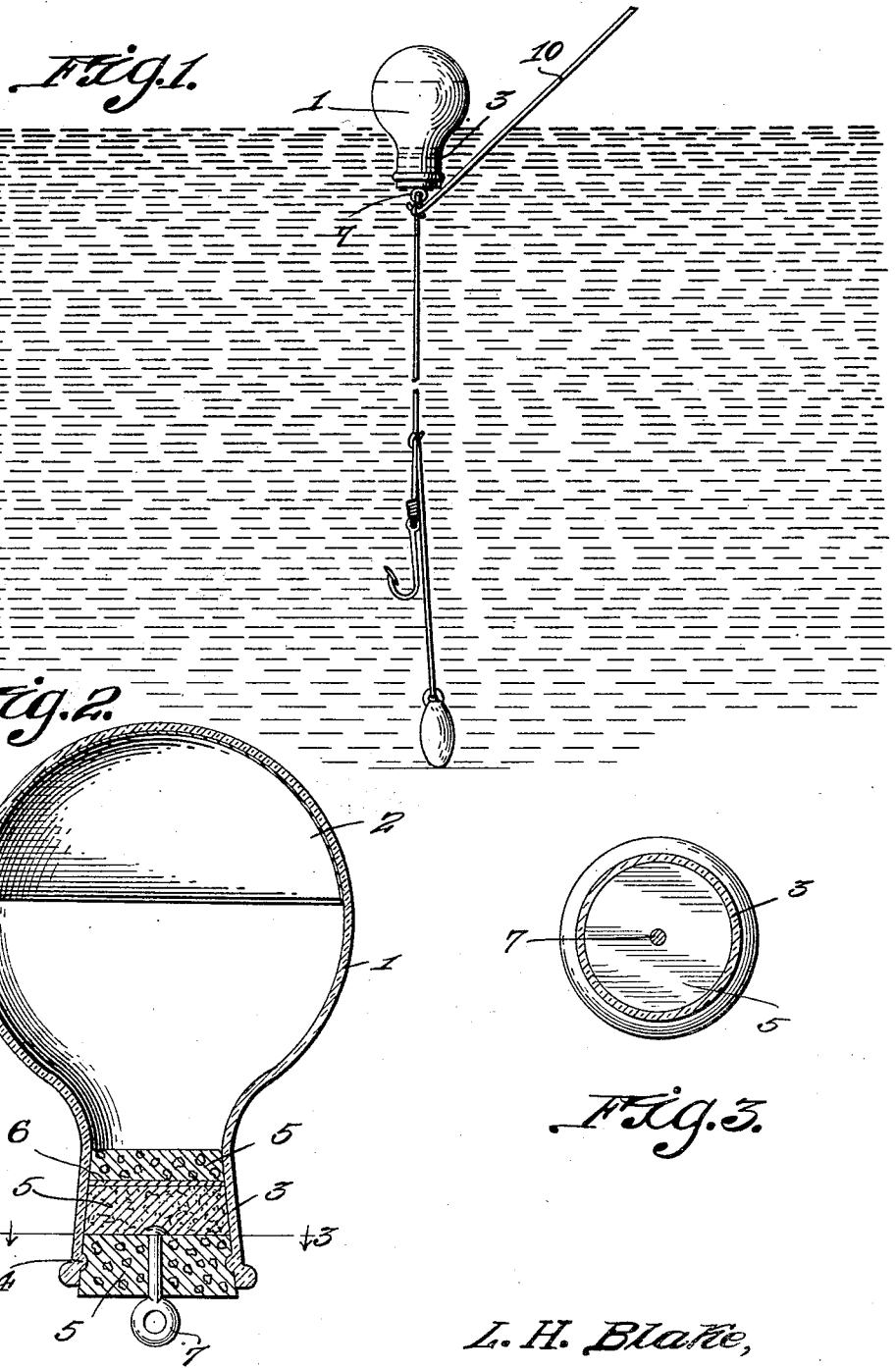

Patented May 5, 1931

1,804,084

UNITED STATES PATENT OFFICE

LOUIS H. BLAKE, OF ALTUS, OKLAHOMA

FISHING LINE FLOAT

Application filed March 14, 1930. Serial No. 435,867.

The object of this invention is the provision of a bob or float for fishing lines which shall be luminous so that the same can be observed both in day and night fishing.

A further object is the provision of a fishing bob or float that shall comprise a hollow substantially pear-shaped member that is hermetically sealed and which has its top treated with luminous substance so that the same can be observed in day and night fishing.

To the attainment of the foregoing the invention consists in the improvement hereinafter described and definitely claimed.

In the drawings:

Figure 1 is a view of the improvement in applied position.

Figure 2 is a substantially longitudinal sectional view through the device.

Figure 3 is a sectional view approximately on the line 3—3 of Figure 2.

As disclosed by the drawings my improved float has its body portion constructed of glass and the same is in the nature of an inverted hollow pear-shaped member. The float 1 has its inner face, at a suitable distance from its top, treated with a luminous substance 2. The bottom or neck 3 of the float has an inwardly directed flange 4 and the said neck is closed by one or a plurality of stoppers 5, which are constructed of cork. When the neck is provided with the stopper 5 the inwardly directed flange or bead 4 will embed itself therein but obviously the neck of the float may be formed to integrally close the same. When a plurality of stopper members are employed there is preferably arranged between these members discs of compressible but water-proof material 6 and secured to the float there is the shank of an eye member 7 to which the line 10 is connected.

My improvement is of extremely simple nature and as the same is luminous it may be successfully employed in both day and night fishing. The advantages of the device will, it is thought, be apparent to those skilled in the art to which such invention relates without further detailed description.

Having described the invention, I claim:

1. A float for fishing lines, comprising a hollow substantially pear-shaped body whose outer rounded end is luminous and whose mouth portion is formed with an inwardly extending bead, a compressible stopper closing the mouth and an eye having a shank embedded in the stopper.

2. A float for fishing lines, comprising a hollow substantially pear-shaped body whose outer rounded end is luminous and whose mouth portion is formed with an inwardly extending bead, a compressible stopper closing the mouth, said stopper comprising a plurality of members having water proof discs arranged therebetween and an eye member having its shank secured in the stopper.

In testimony whereof I affix my signature.

LOUIS H. BLAKE.